(12) United States Patent
Pedrini

(10) Patent No.: US 8,757,462 B2
(45) Date of Patent: Jun. 24, 2014

(54) STRAP-MOUNTED STABILIZER FOR A BICYCLE CARRIER

(76) Inventor: Fabio Pedrini, Bologna (IT)

( * ) Notice: Subject to any disclaimer, the term of this patent is extended or adjusted under 35 U.S.C. 154(b) by 0 days.

(21) Appl. No.: 13/440,084

(22) Filed: Apr. 5, 2012

(65) Prior Publication Data

US 2012/0193384 A1 Aug. 2, 2012

Related U.S. Application Data

(63) Continuation of application No. 12/580,586, filed on Oct. 16, 2009.

(60) Provisional application No. 61/140,404, filed on Dec. 23, 2008.

(51) Int. Cl.
*B60R 9/00* (2006.01)
*B60R 9/04* (2006.01)
*B60R 9/048* (2006.01)

(52) U.S. Cl.
USPC ........... 224/572; 224/493; 224/497; 224/532; 224/570; 224/314; 224/324; 224/924

(58) Field of Classification Search
USPC ......... 224/572, 493, 497, 532, 570, 314, 324, 224/924
See application file for complete search history.

(56) References Cited

U.S. PATENT DOCUMENTS

| 2,988,253 | A | * | 6/1961 | Menghi | 224/318 |
| 3,464,608 | A | * | 9/1969 | Rodriguez | 224/515 |
| 4,298,151 | A | * | 11/1981 | O'Connor | 224/329 |
| 4,437,597 | A | | 3/1984 | Doyle | |
| 4,452,385 | A | * | 6/1984 | Prosen | 224/493 |
| 4,513,897 | A | * | 4/1985 | Graber | 224/493 |
| 4,726,499 | A | * | 2/1988 | Hoerner | 224/314 |
| 4,830,250 | A | * | 5/1989 | Newbold et al. | 224/314 |
| 4,875,608 | A | * | 10/1989 | Graber | 224/493 |
| 5,056,700 | A | * | 10/1991 | Blackburn et al. | 224/324 |
| 5,067,641 | A | * | 11/1991 | Johnson et al. | 224/501 |
| 5,259,542 | A | | 11/1993 | Newbold et al. | |
| 5,495,970 | A | | 3/1996 | Pedrini | |
| 5,505,357 | A | | 4/1996 | Chimenti et al. | |

(Continued)

FOREIGN PATENT DOCUMENTS

| EP | 0671295 | 9/1995 |
| FR | 2699874 | 7/1994 |
| FR | 2755923 | 5/1998 |
| WO | 2004039635 | 5/2004 |

OTHER PUBLICATIONS

Solo Rack, http://www.saris.com/p-378-solo.aspx, Apr. 6, 2010, Saris Cycling Group, Inc.
Sentinel-2 Rack, http://www.saris.com/p-198-sentinel-2-bike.aspx, Apr. 6, 2010, Saris Cycling Group, Inc.
Sentinel-3 Rack, http://www.saris.com/p-199-sentinel-3-bike.aspx, Apr. 6, 2010, Saris Cycling Group, Inc.

(Continued)

*Primary Examiner* — Brian D. Nash
*Assistant Examiner* — Derek Battisti
(74) *Attorney, Agent, or Firm* — Boyle Fredrickson, S.C.

(57) ABSTRACT

A vehicle-mounted equipment carrier includes a single-piece frame member. The vehicle-engaging and equipment-engaging members extend outward from a central portion. Optionally, the equipment carrier may be mounted in at least a first and second operational orientation. The interior of each equipment support is hollow such that one equipment support may be stacked within another. Straps pass through and are secured to the frame member. The straps are further connected to a vehicle to secure the frame member to the vehicle.

9 Claims, 18 Drawing Sheets

(56) References Cited

U.S. PATENT DOCUMENTS

| | | | |
|---|---|---|---|
| 5,573,165 | A | 11/1996 | Bloemer et al. |
| 5,676,291 | A | 10/1997 | Wolf et al. |
| 5,938,093 | A | 8/1999 | Bloemer et al. |
| 6,286,738 | B1 | 9/2001 | Robins et al. |
| 6,422,443 | B1 | 7/2002 | Erickson et al. |
| 6,616,023 | B1 | 9/2003 | Dahl et al. |
| 6,772,927 | B2 | 8/2004 | Bogoslofski |
| 2002/0117524 | A1* | 8/2002 | Jeong .......................... 224/314 |
| 2006/0138186 | A1 | 6/2006 | Pedrini |

OTHER PUBLICATIONS

Little Joe 3 Rack, http://www.yakima.com/racks/bike-racks/product/8002617/littlejoe-3.aspx, Apr. 6, 2010, Yakima Products.
Model 102A Rack, http://allenracks.com/subpages/productsNew/trunk/102a.php, Apr. 6, 2010, Allen Sports.
Model 103A Rack, http://allenracks.com/subpages/productsNew/trunk/103a.php, Apr. 6, 2010, Allen Sports.
F1B "Original" Trunk Racks, http://www.hollywoodracks.com/trunk-racks/F1B-trunk-rack.com, Apr. 6, 2010, Hollywood Racks.

* cited by examiner

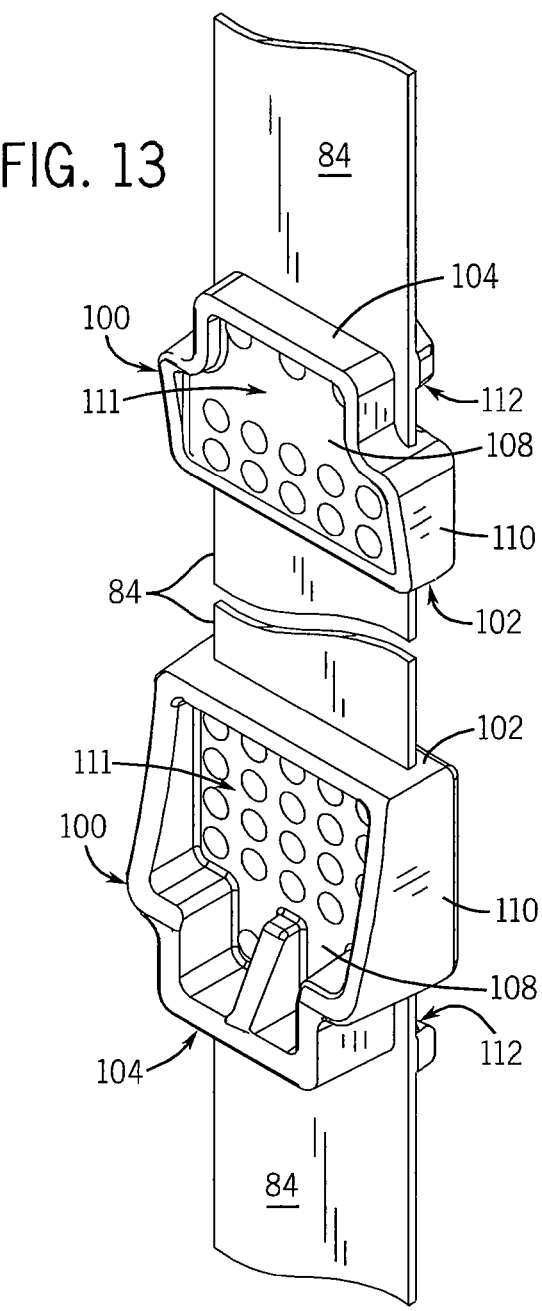
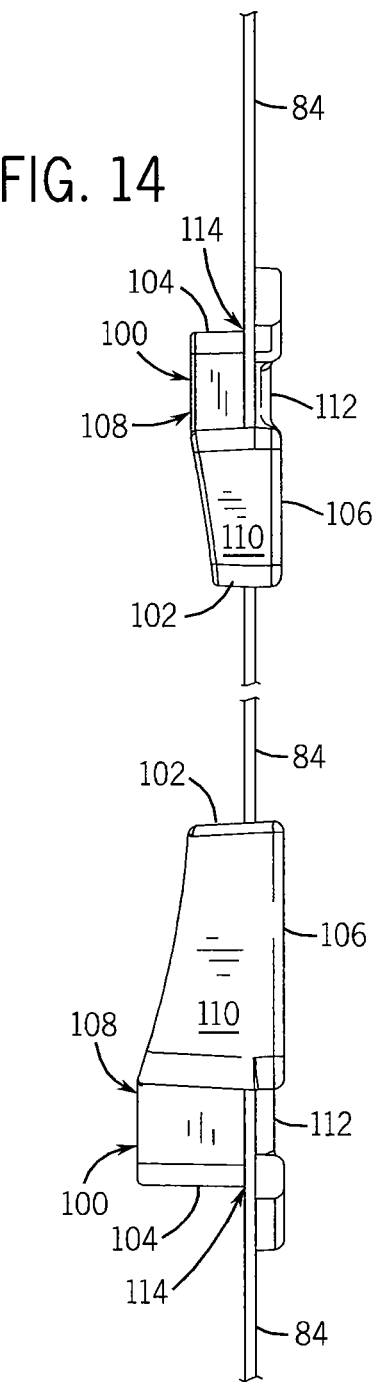

STRAP-MOUNTED STABILIZER FOR A BICYCLE CARRIER

CROSS-REFERENCE TO RELATED APPLICATIONS

This application is a continuation of application Ser. No. 12/580,586 filed Oct. 16, 2009.

This application claims priority to U.S. provisional application Ser. No. 61/140,404, titled "Single Frame Member Equipment Support Assembly" and filed on Dec. 23, 2008, the entire contents of which is incorporated herein by reference.

BACKGROUND AND SUMMARY OF THE INVENTION

The subject matter disclosed herein relates to a vehicle-mounted equipment carrier, such as a bicycle rack, and more particularly to an equipment carrier of the type that is typically mounted to the trunk or tailgate area of a vehicle.

As is known to those skilled in the art, a vehicle-mounted equipment carrier, such as a bicycle carrier, typically contacts the vehicle with at least two leg assemblies. The leg assemblies may consist of a single leg, a pair of legs, or have a cross-member between the legs, resulting in a u-shaped leg assembly. The equipment carrier also includes a support arrangement such as a pair of spaced apart arms, configured to receive and support a component of the bicycle, such as the top tube of the bicycle. Each of the leg and arm assemblies typically pivot about one or more axes such that the arm and leg assemblies may be adjusted for mounting to a vehicle or for storage. However, each pivot point requires a means to secure the arm or leg at a particular angular relationship to the pivot axis. The securing means must be able to withstand the stress resulting from the weight of the equipment and from bouncing and vibration of the equipment as the vehicle transports the equipment.

The pivoting arm and leg assemblies add cost and complexity to the equipment carrier. In addition to the securing means, the arm and leg assemblies must be connected. Each assembly must be adjusted, often independently of the other, to the proper rotational alignment to interface the vehicle. The extra components add cost and the independent adjustments of each assembly add complexity to connecting and using the carrier. Thus, in certain applications, it would be desirable to provide a vehicle-mounted equipment carrier having a one-piece, fixed position frame construction that has a reduced cost, eliminates stress transfer points, and results in easier setup and use.

In accordance with one aspect of the invention, a vehicle-mounted equipment carrier is provided that includes a one-piece frame having a central section to which an upper portion for holding the equipment and a lower portion for engaging the vehicle are connected. Each of the upper and lower portions is connected in a fixed relationship to the central section by virtue of the one-piece construction of the frame. Thus, it is a feature of the invention to provide an equipment support which does not require adjustments between the leg and arm assemblies, and thus eliminates the cost and complexity associated with separate manufacture and assembly of such components.

According to another aspect of the invention, the one-piece frame of the equipment carrier may have a hollow interior. Thus, it is another feature of the invention that the equipment carrier will be light-weight for ease of setup and use.

It is another feature of the invention to provide low-cost construction by molding the frame as a single-member.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the subject matter disclosed herein are illustrated in the accompanying drawings in which like reference numerals represent like parts throughout, and in which:

FIG. 13 is a partial isometric view, illustrating a portion of the strap and stop members incorporated into the carrier of FIG. 1;

FIG. 14 is a side elevation view of the strap and stop members of FIG. 13;

Figure 1:
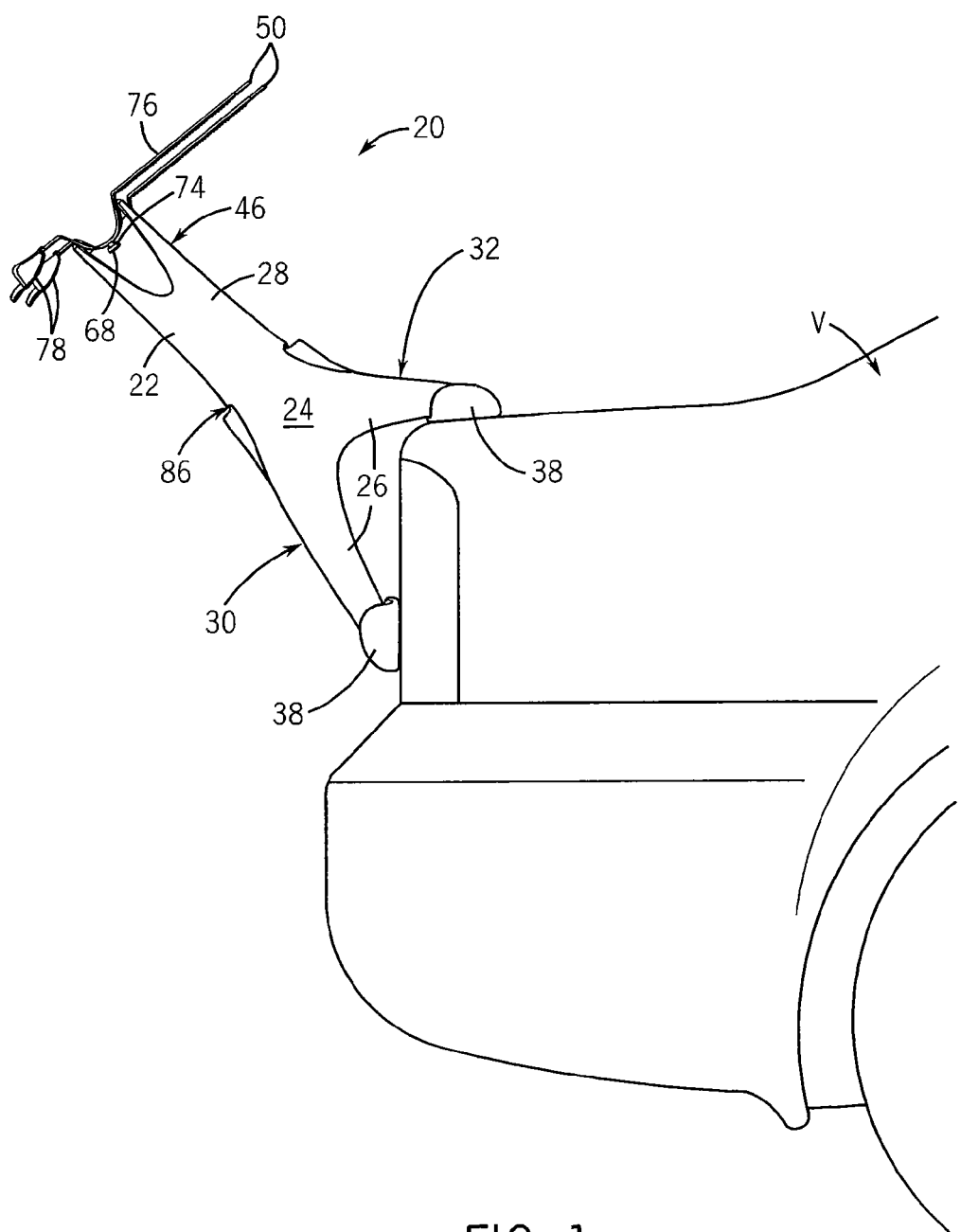
FIG. 1 is a side elevation of an equipment carrier constructed according to one embodiment of the present invention, in which the equipment carrier is mounted to a vehicle and is illustrated in a first operational configuration.
Figure 2:
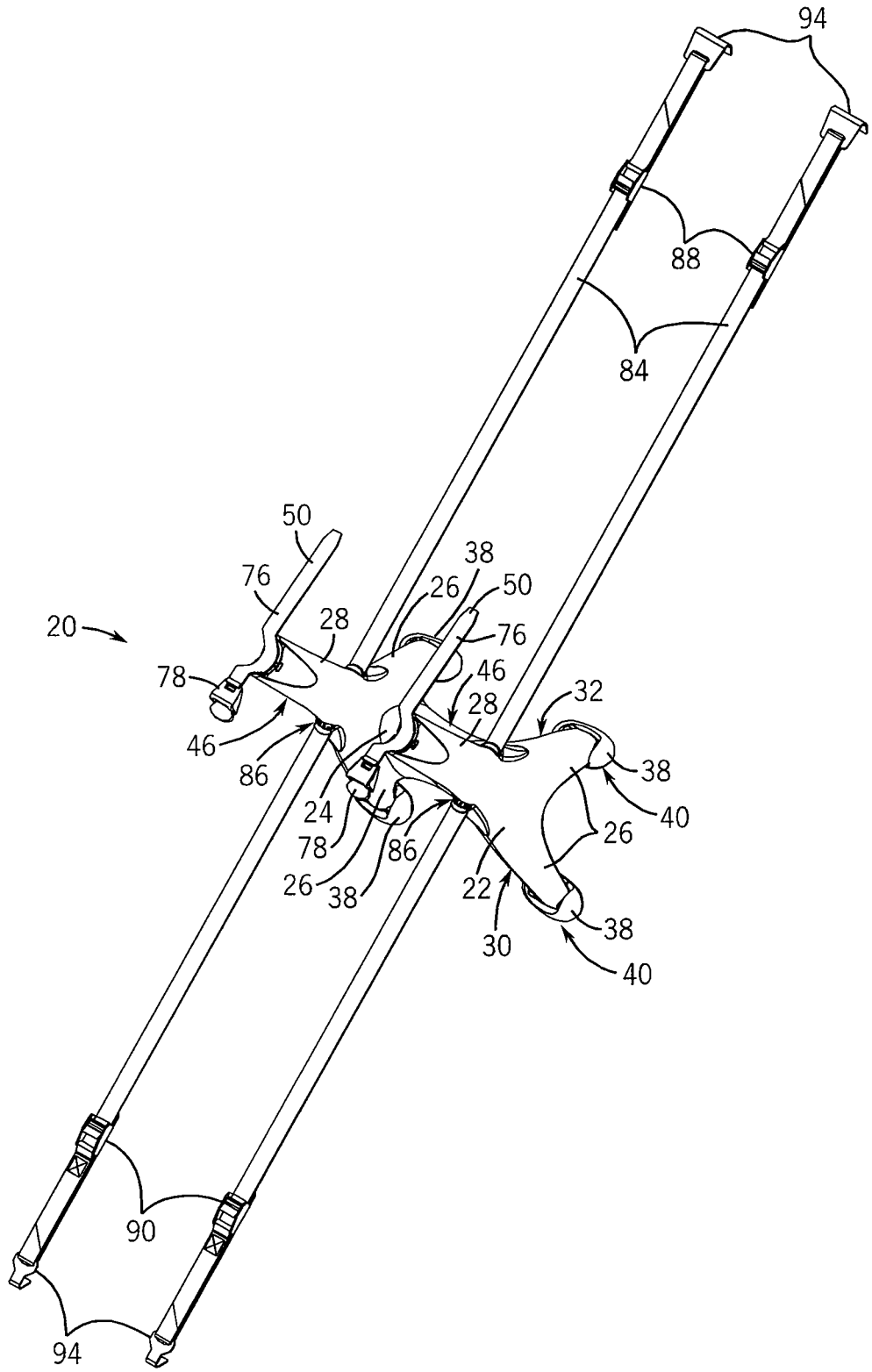
FIG. 2 is an isometric view of the carrier of FIG. 1.
Figure 3:
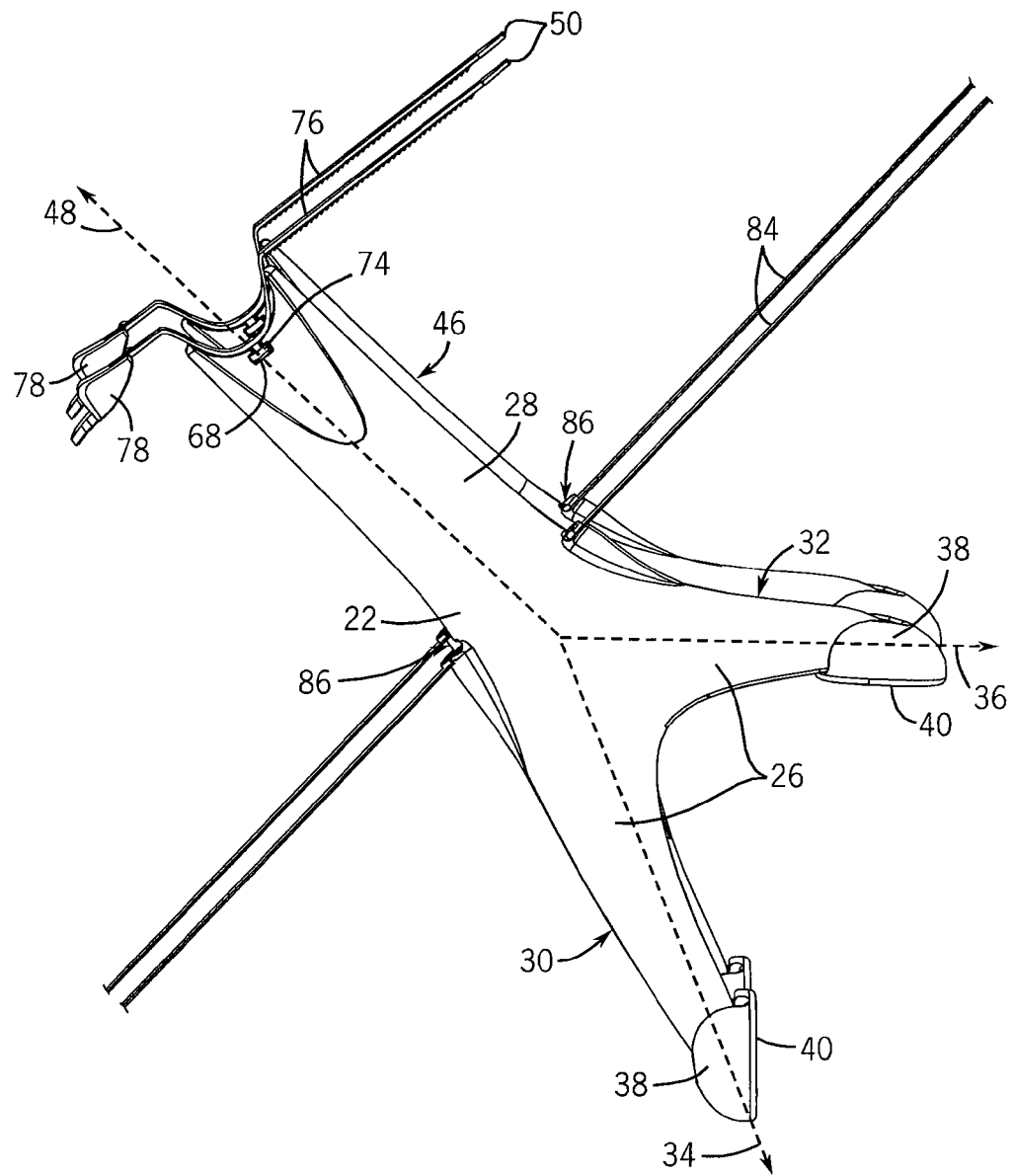
FIG. 3 is a side elevation of the carrier of FIG. 1.
Figure 4:
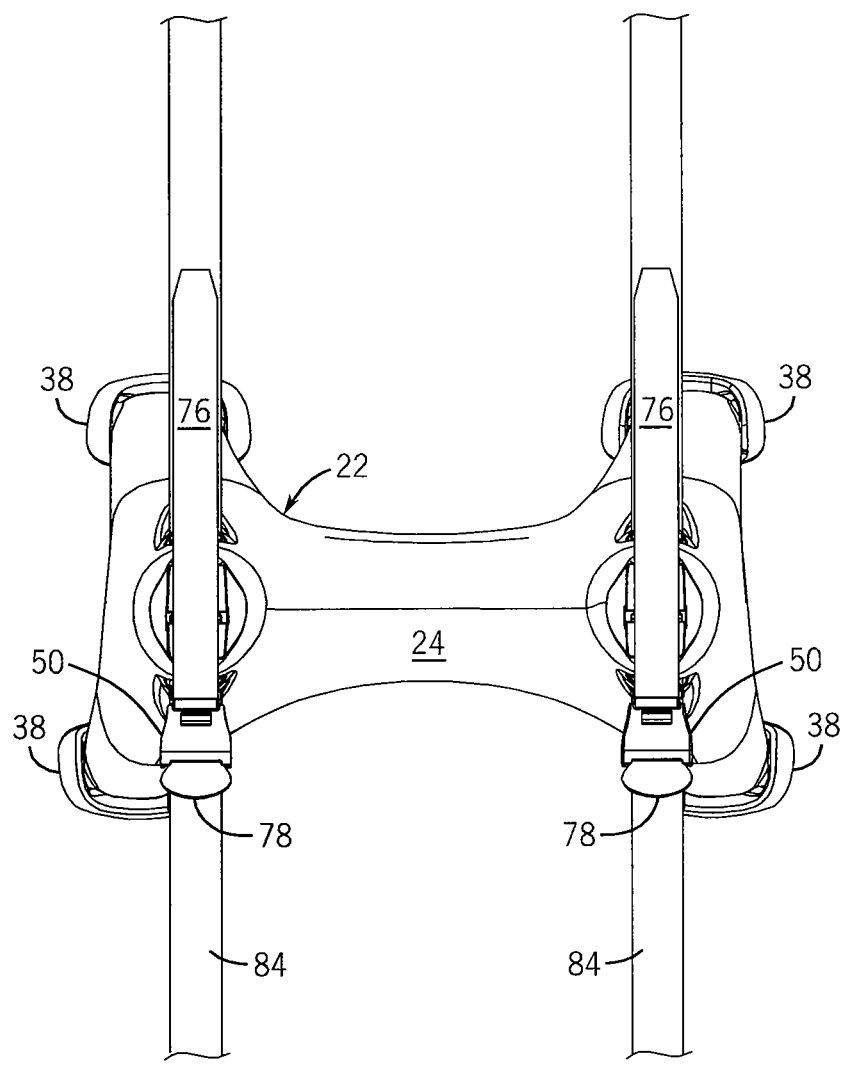
FIG. 4 is a top plan of the carrier of FIG. 1.
Figure 5:
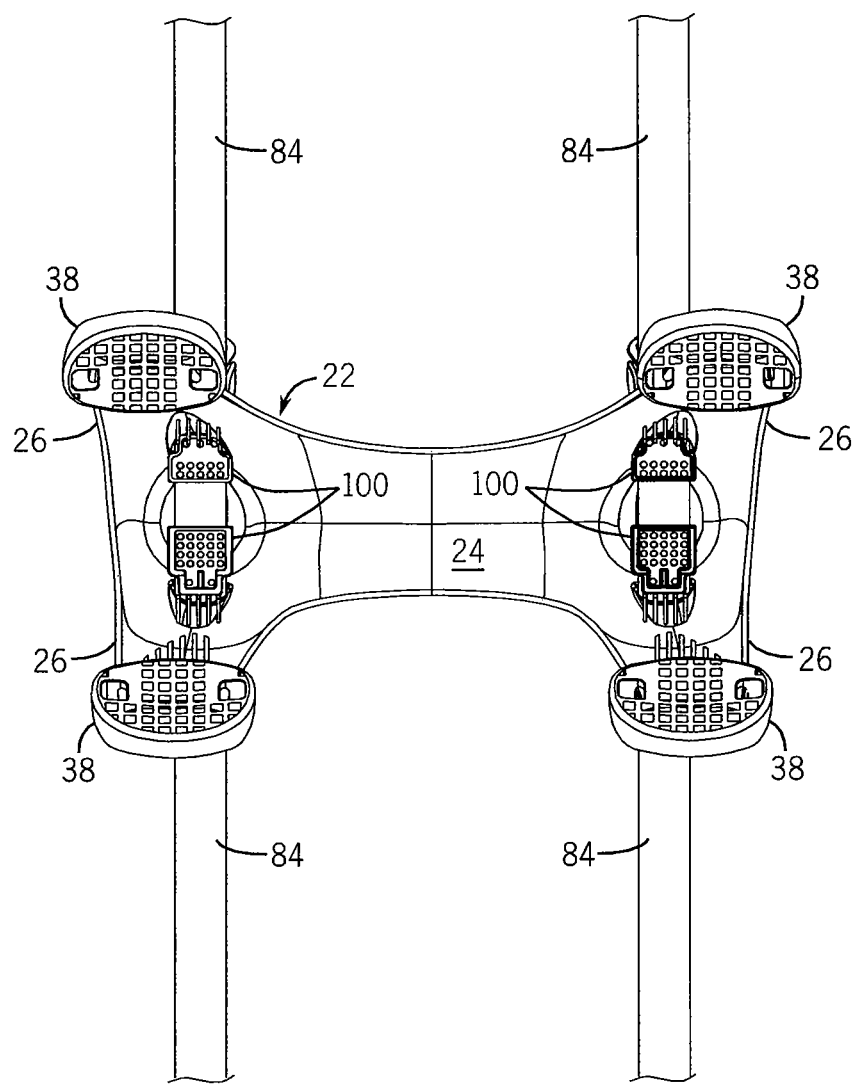
FIG. 5 is a bottom plan of the carrier of FIG. 1.
Figure 6:
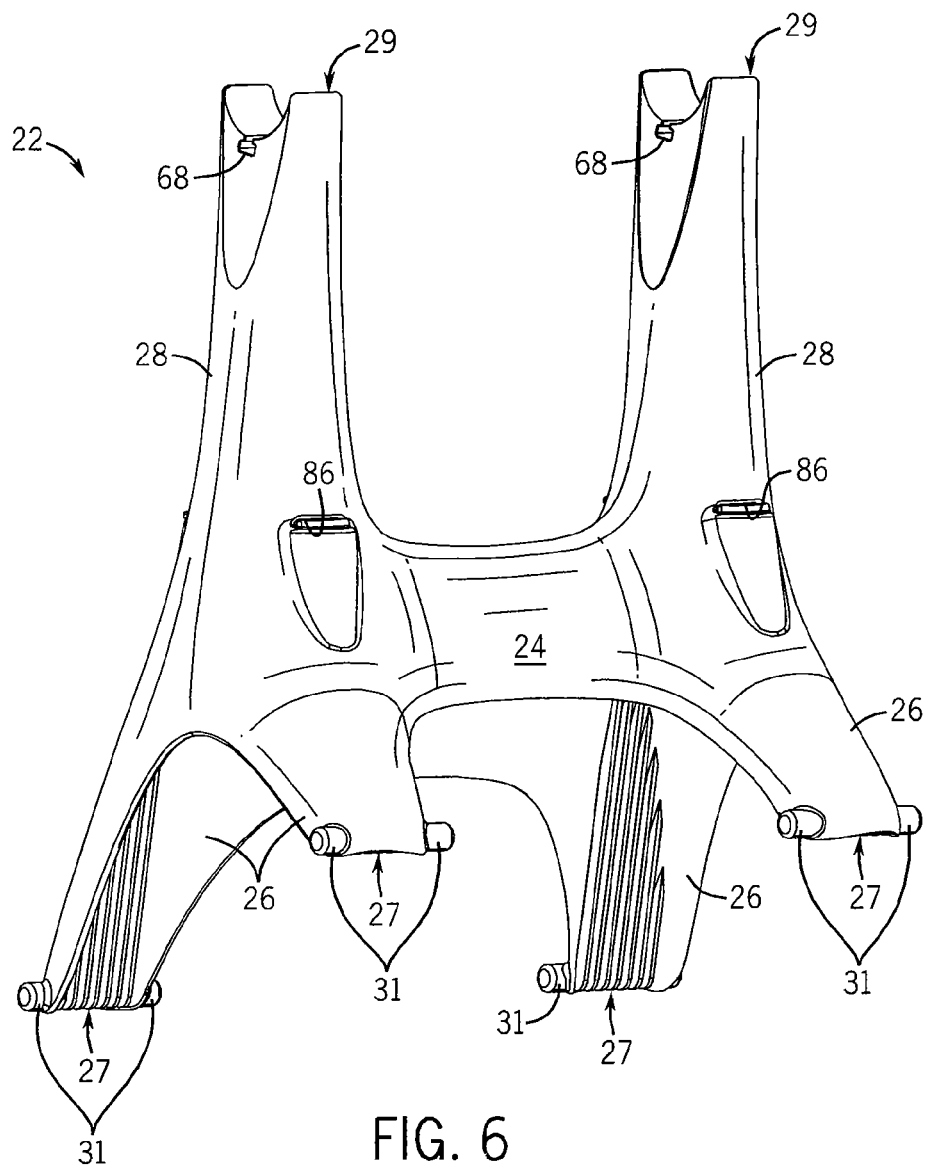
FIG. 6 is a partial isometric view, illustrating a frame member incorporated into the carrier of FIG. 1.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Specific embodiments of the present invention will now be further described by the following, non-limiting examples which will serve to illustrate various features of the invention. With reference to the drawing figures in which like reference numerals designate like parts throughout the disclosure, a representative embodiment of the present invention is shown in FIGS. 1-5 as an equipment carrier or support 20 configured for mounting to a vehicle, shown at V.

The equipment support 20 includes a single, one-piece frame member 22. The frame member 22 is preferably a molded-plastic member to simplify manufacture, and may have a hollow cross section to reduce the cost of the equipment support 20. The frame member 22 includes a central portion 24 from which at least one upper portion, for example an arm 28, and at least one lower portion, for example a leg 26, extends. The frame member 22 preferably includes a first lower portion and a second lower portion, for example a first and second pair of legs 30 and 32 extending away from the central portion 24 along a first and a second axis 34 and 36, respectively, and adapted to engage the vehicle V. Alternately, each of the lower portions may include a single leg 26 or a U-shaped member extending away from the central portion 24. The angle α between the first axis 34 and the second axis 36 is between about thirty and about ninety degrees such that each pair of legs 30 and 32 preferably engages a different surface of a vehicle V.

Each leg 26 preferably includes a wall having a generally arcuate cross-section, the curve of which extends outward and spans approximately one hundred eighty degrees. The leg 26 is wider nearest the central portion 24 of the frame member 22 and tapers toward the distal end 27 of the leg 26. Alternately, the cross-section of each leg 26 may be any suitable shape such as rectangular, circular, oval, square, triangular, or a combination thereof. The cross-sectional area of each leg 26 may further remain constant or taper to either a smaller or larger area as is suitable for the equipment being carried. If the lower portion includes a pair of legs, 30 or 32, the central portion 24 of the frame member 22 is preferably molded to form an arcuate surface between each of the legs 26. Alternately, the central portion 24 may be molded to any suitable shape to join the legs 26. If the lower portion includes a single leg 26, a solid member may extend from the central portion 24 to the vehicle V. If the lower portion is a U-shaped leg 26, the two side members of the U-shaped leg 26 extend from the central portion 24 and the cross member is configured to engage the vehicle V.

Figure 7:
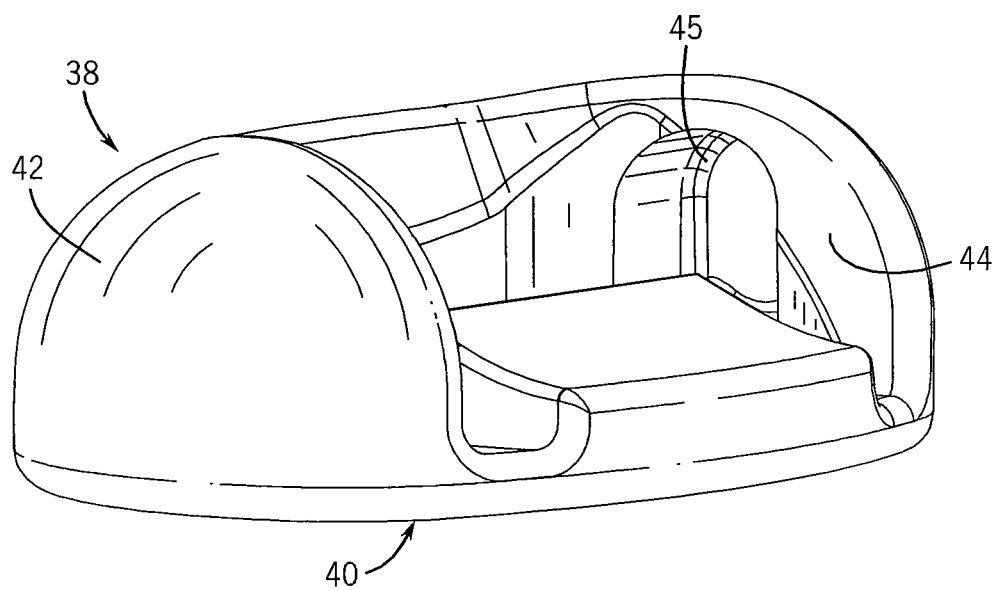
FIG. 7 is a partial isometric view, illustrating a pivoting foot incorporated into the carrier of FIG. 1.

In one embodiment, the equipment support 20 further includes a foot 38, as shown in FIG. 7, connected at the distal end 27 of each leg 26. Each foot 38 includes a flat surface 40 which engages the surface of the vehicle V. A side surface 42 extends upward from and around a portion of the periphery of the flat surface 40, at least partly defining an inner portion 44 of the foot 38 configured to receive the distal end 27 of the leg 26. The foot 38 is preferably pivotably connected to the leg 26, to enable the foot 38 to be positioned in different angular orientations relative to the leg 26 and to thereby allow the equipment support 20 to be engaged with differently configured vehicles. The distal end 27 of each leg 26 includes a pair of tabs 31 extending from opposite sides of the leg 26. Each foot 38 includes a recessed portion 45 on opposite sides of the inner portion 44 of the foot configured to receive one of the tabs 31. Optionally, the inner portion 44 of the foot 38 may have a round tab formed on each of opposing sides of the inner portion 44. Each leg 26 may have a recessed portion or a hole extending through the corresponding sides of the distal end 27 of the leg 26 and configured to receive the tabs, allowing the foot 38 to pivot about the end of the leg 26. Alternately, any means known in the art may be used to pivotally connect the foot to the leg, such as a screw, a bolt, or rod extending through the leg 26 and connected to the foot 38.

In another embodiment, each leg 26 includes a foot 38 that is rigidly connected to the leg. For example, the foot 38 may be integrally molded with the leg 26 or connected by any means known in the art. The foot 38 may include a flat surface 40 or, alternately, be rounded. Each foot 38 may further include a padded material mounted to the foot 38 such that the padded material interfaces with the vehicle V.

In still another embodiment, each leg 26 may be configured to directly engage the vehicle V. For example, the cross member of a U-shaped leg 26 directly engages a surface of the vehicle V. It is additionally contemplated that a lower portion of any configuration may similarly be configured to directly engage the vehicle V. For example, the distal end of a single leg, or each end of a pair of legs, may be molded to include a flat surface, rounded portion, or any other shape suitable to engage the vehicle V. The portion of the leg 26 engaging the vehicle V may further include a padded material mounted to the leg 26 such that it is positioned between the leg 26 and the vehicle V.

For convenience, this specification may refer to a bicycle as an exemplary piece of equipment, but it is contemplated that the equipment support may be configured to support any type of equipment that may be carried external to a vehicle, for example a pair of skis.

The frame member 22 further includes at least a first upper portion, for example a first pair of arms 46 extending away from the central portion 24 along a third axis 48, adapted to support a bicycle. It is contemplated that the third axis 48 may extend away from the central portion 24 in a plane generally aligned with either the first or the second axis, 34 or 36. Alternately, the third axis 48 may extend away from the central portion 24 along a plane distinct from, and not aligned with, either the respective first or second axes, 34 or 36.

Alternately, the frame member 22 may include a first and a second upper portion extending along a third axis 48 and a fourth axis, not shown. It is contemplated that the cross-section of the first and second upper portions may be the same as the first and second lower portions. Further, the angle between the third and fourth axes may be the same as the angle between the first and second axes. Each of the upper and lower portions may further be configured to engage a vehicle and also adapted to support a bicycle. This configuration allows the upper and lower portions to be interchanged such that either the upper or lower portion may engage the vehicle and the other of the upper or lower portion may support the bicycle.

In yet another embodiment, the angle between the third and fourth axes may be different than the angle between the first and second axes. Each of the upper and lower portions may again be configured to engage a vehicle and also adapted to support a bicycle. In this configuration, either the lower or the upper portion may engage the vehicle V according to which angle provides the best fit to the vehicle and the other of the upper or lower portion may support the bicycle.

In one embodiment, the frame member 22 includes a single upper portion having a pair of arms 46 extending away from the central portion 24 along a third axis 48 and generally away from both pairs of legs 30 and 32. Each arm 28 includes a generally oval cross-section that is wider nearest the central portion 24 of the frame member 22 and tapers toward the distal end 29 of the arm 28. Optionally, the cross-section of each arm 28 may be any suitable shape such as circular, oval, square, triangular, or a combination thereof. The cross-sectional area of each arm 28 may further remain constant or taper to either a smaller or larger area as is suitable for the equipment being carried. Each arm 28 is configured to receive at least one equipment retention member 50, preferably, at the distal end 29 of the arm 28. Optionally, the equipment retention member 50 can be positioned in different orientations around the periphery of the cross section of the arm 28 such that a bicycle may be secured to an upward facing surface of the arm 28. It is further contemplated that each arm may have a single equipment retention member 50 positioned at a suitable distance along the arm 28 with no equipment retention member 50 positioned at the distal end 29 of the arm 28.

In one embodiment, as illustrated in FIGS. 1-4, the distal end 29 of the arm 28 is generally curved inward to the arm 28. Preferably, the radius of the curve generally corresponds to an average radius of a bicycle member with which the curved portion is configured to engage. Alternately, the radius of the curve may correspond to an upper end of a range of radii of bicycle members such that the largest diameter bicycle member may fully engage the curved portion. It is further contemplated that the radius of the curve may be configured to accept the outer diameter of a loop formed by the equipment retention member 50. A channel, or recess, 68 extending through at least a portion of the curved surface at the distal end 29 of the arm 28 is configured to receive the equipment retention member 50. The width of the channel 68 is preferably narrower adjacent to the curved surface than at a point extending further into the arm 28. The channel 68 is in communication with at least one side, and optionally, both sides, of the arm 28 such that the equipment retention member 50 may slidably engage the channel 68.

Figure 24:
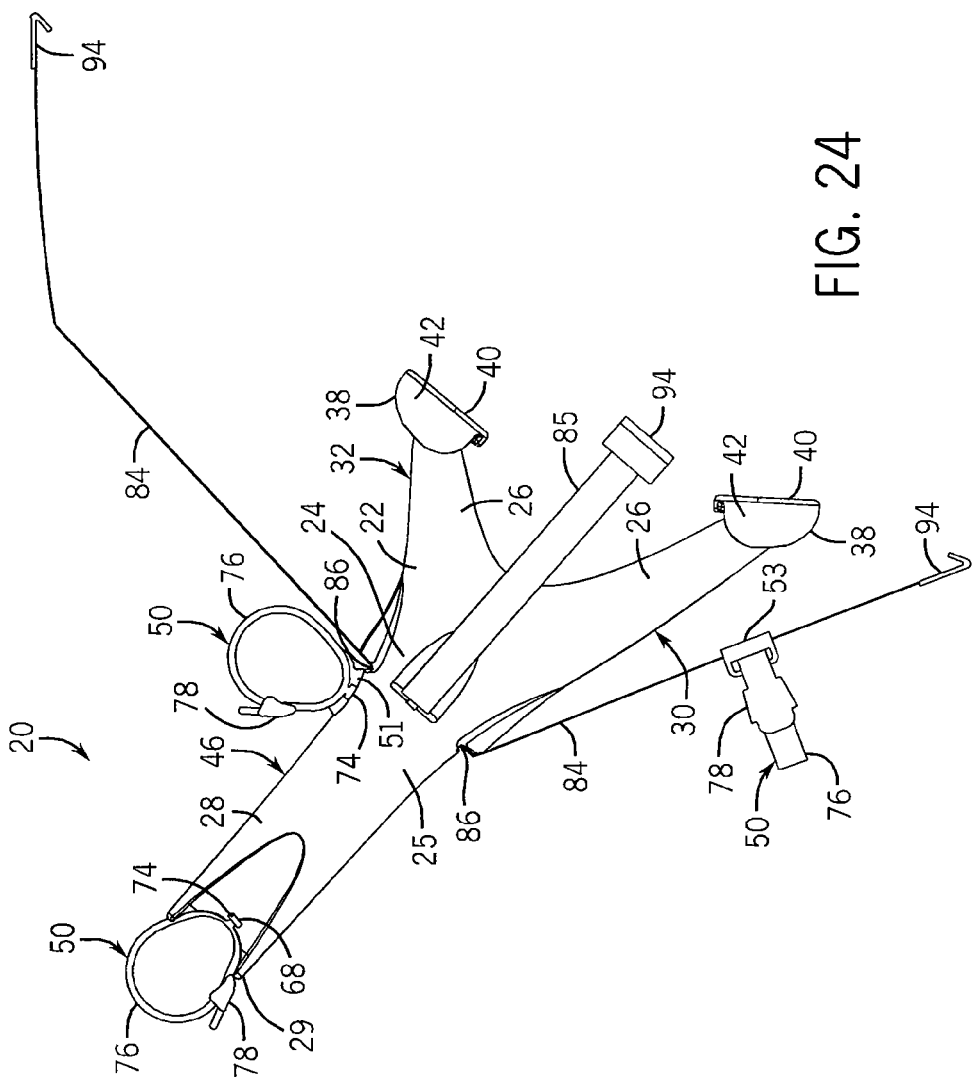
FIG. 24 is a side elevation view of an equipment carrier constructed according to another embodiment of the present invention, in which the equipment carrier is mounted to a vehicle and is illustrated in a first operational configuration.
Figure 25:
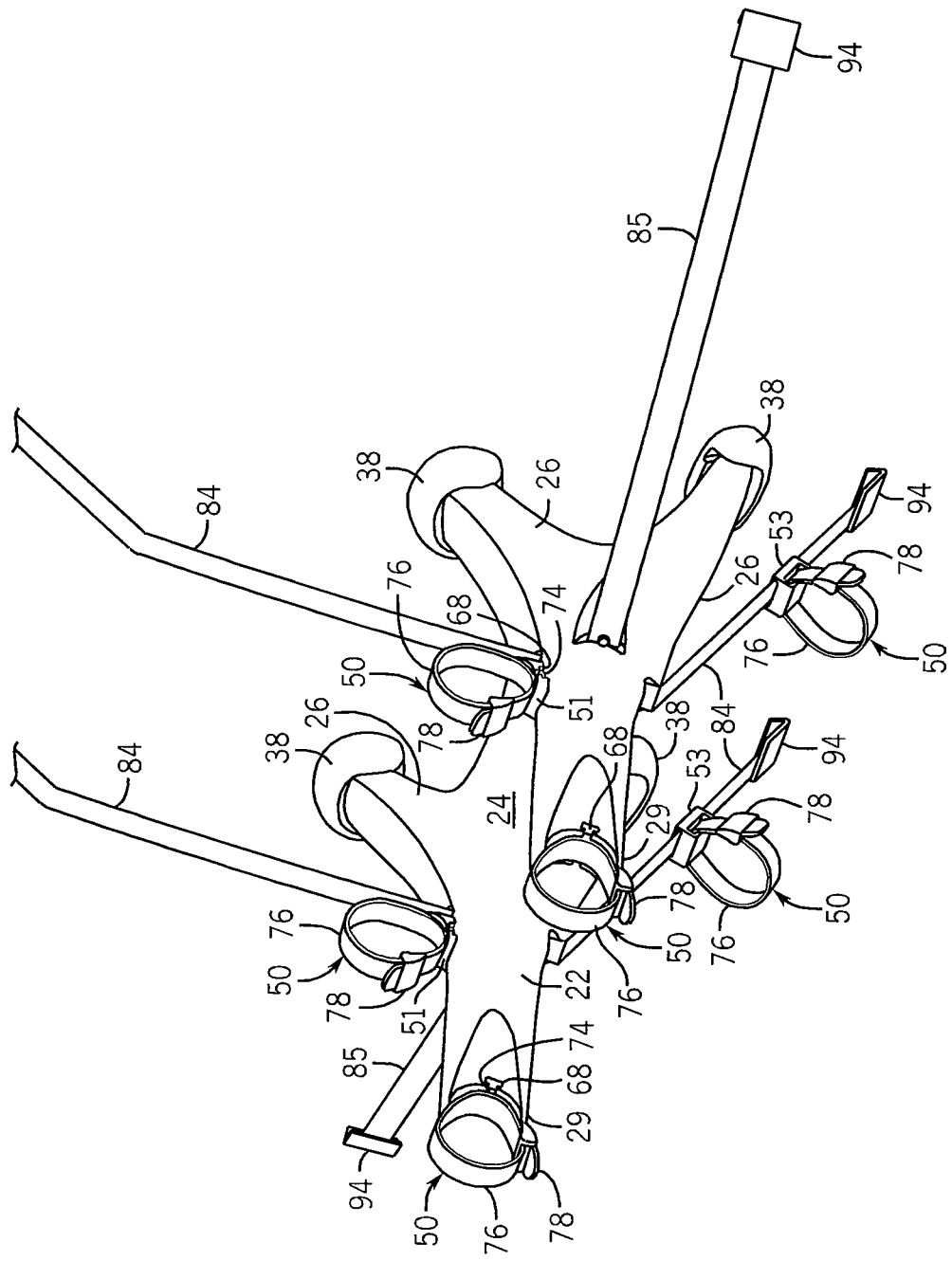
FIG. 25 is an isometric view of the carrier of FIG. 24.
Figure 26:
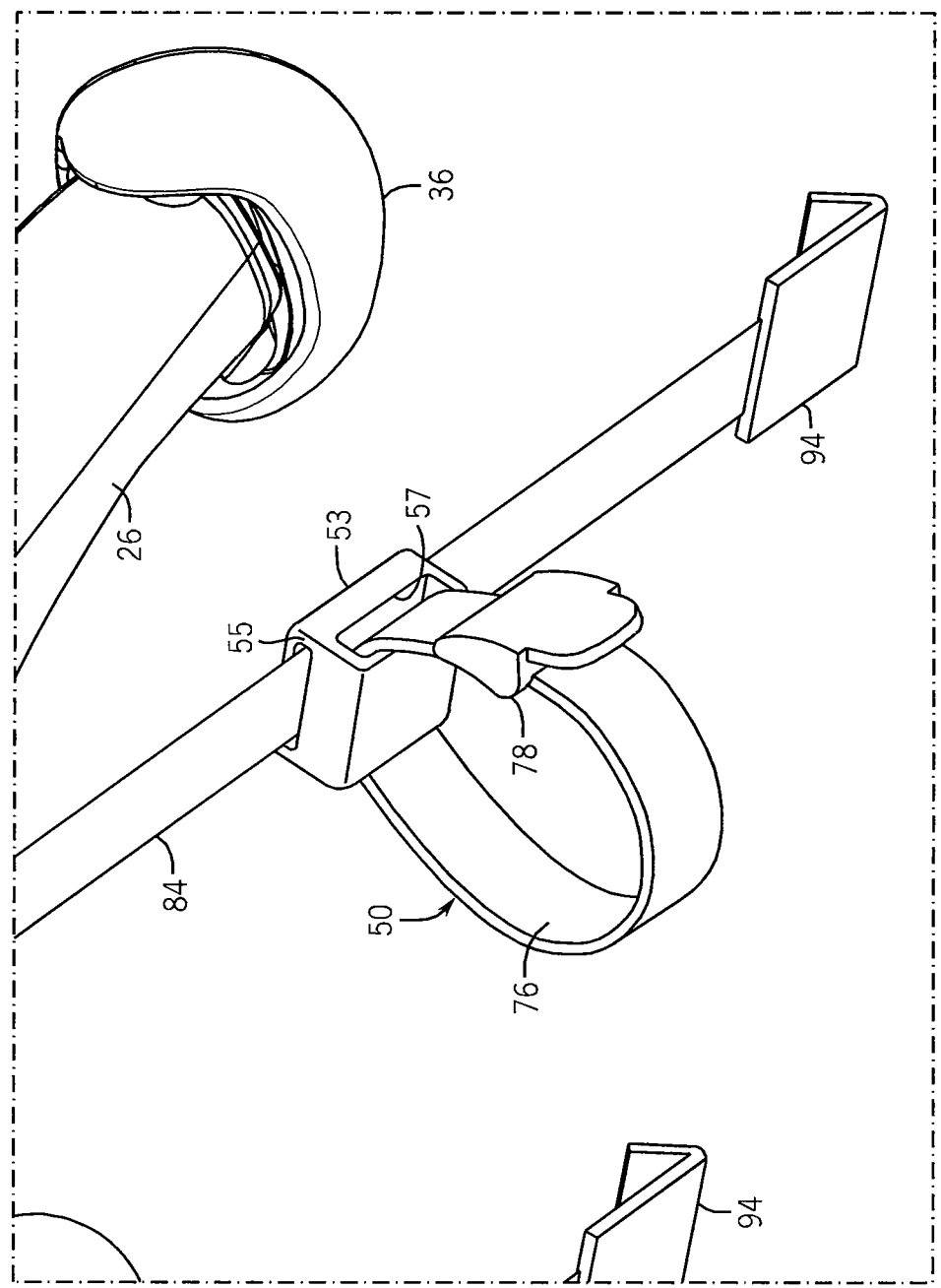
FIG. 26 is a partial isometric view, illustrating a retention block incorporated into the carrier of FIG. 24.

In another embodiment as illustrated in FIGS. 24-26, each arm 28 may be configured to receive at least one additional equipment retention member 50 along the arm 28 positioned at a suitable distance between the central portion and the distal end 29 of the arm 28 such that a second bicycle may be supported by the arm 28. Preferably, a retainer member 51 is formed near the proximal end 25 of the arm 28. The retainer member 51 defines, at least in part, a channel, or recess, 68 to receive the additional equipment retention member 50. The retainer member 51 may further include a curved surface facing away from the arm 28 to receive a bicycle. Preferably, the radius of the curved surface generally corresponds to an average radius of a bicycle member with which the curved portion is configured to engage. Alternately, the radius of the curve may correspond to an upper end of a range of radii of bicycle members such that the largest diameter bicycle member may fully engage the curved portion. It is further contemplated that the radius of the curve may be configured to accept the outer diameter of a loop formed by the equipment retention member 50. Preferably, an equipment retention member 50 may alternately engage the channel 68 formed in either the distal end 29 of the arm 28 or defined by the retainer member 51.

In still another embodiment, as illustrated in FIGS. 19-23, the front surface 52 of the arm 28 includes a first curved portion 58 and a first flat portion 60. The rear surface 54 of the arm 28 includes a second curved portion 62 and a second flat portion 64. Each curved portion 58 and 62 is generally concave and preferably extends from each flat portion 60 and 64 to the distal end of the arm. Alternately, each curved portion may be entirely disposed within at least a part of each flat portion. Preferably, the radius of the curved surface generally corresponds to an average radius of a bicycle member with which the curved portion is configured to engage. Alternately, the radius of the curve may correspond to an upper end of a range of radii of bicycle members such that the largest diameter bicycle member may fully engage the curved portion. It is further contemplated that the radius of the curve may be configured to accept the outer diameter of a loop formed by the equipment retention member 50. A portion of the outer periphery of the channel 68 is adjacent to each of the curved portions 58 and 62 on the front and rear surfaces 52 and 54 of the arm 28. A first slot 70 and a second slot 72 are formed in the curved portions 58 and 62 such that the slots are in communication with the channel 68.

Figure 8:
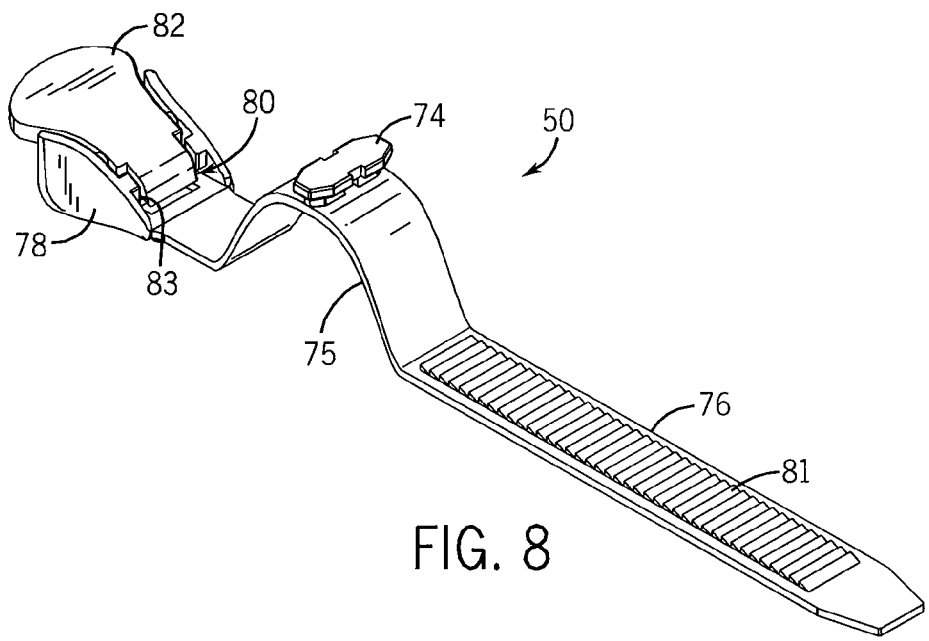
FIG. 8 is a partial isometric view, illustrating an equipment retention mechanism incorporated into the carrier of FIG. 1.
Figure 9:
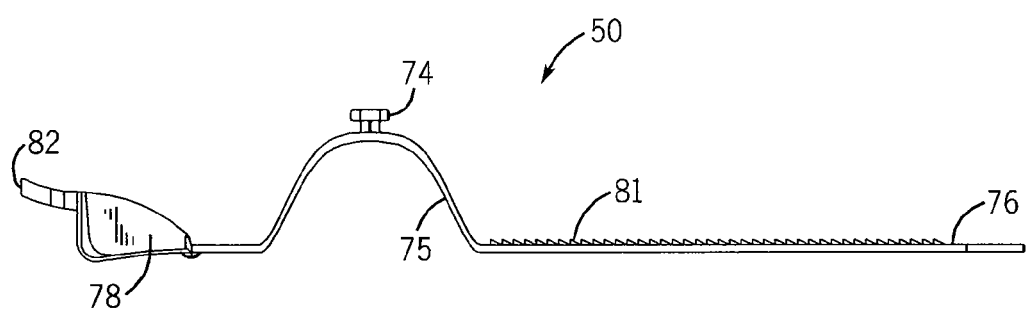
FIG. 9 is a side elevation view of the equipment retention mechanism of FIG. 8.
Figure 10:
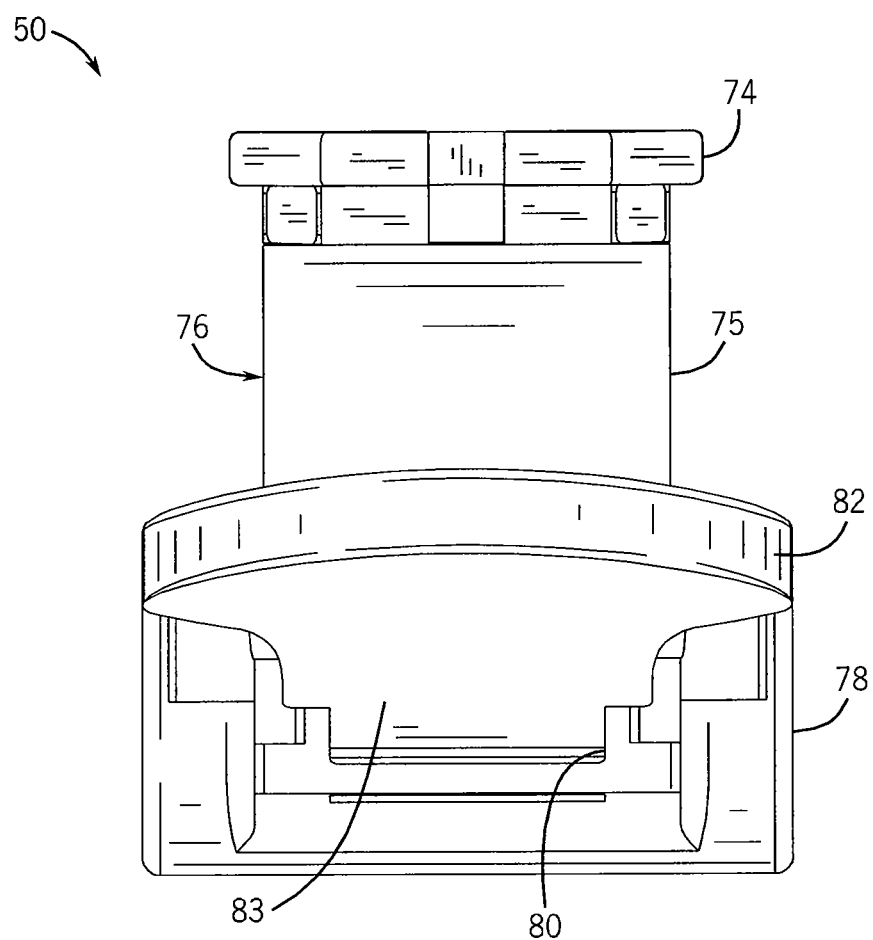
FIG. 10 is a front elevation view of the equipment retention mechanism of FIG. 8.

The equipment retention member 50, as shown in FIGS. 8-10, is configured to engage the channel 68 and the curved surface on each arm 28. The equipment retention member 50 has a retaining portion 74 configured to engage the channel 68 and to secure the retention member 50 to the arm 28. The retention member 50 also has a band portion 76 configured to secure equipment, such as a bicycle, to the arm 28. The band portion 76 preferably includes a curved segment 75 formed to engage the curved surface of the arm 28. The band portion 76 is additionally joined to the retaining portion 74 along the curved segment 75 such that the equipment retention member 50 may slidably engage the channel 68. The retaining portion 74 and the band portion 76 may be made of a single, molded-plastic construction or alternately may be of two-piece construction and joined by any suitable means. The equipment support 20 may further include a cap 77 that engages the channel 68. For instance the cap 77 may be screwed, pushed, or snapped into the channel 68.

As shown in FIGS. 24-26, the equipment support 20 may include additional equipment retention members 50 connected to a lower portion of a strap 84. A retention block 53 has a first opening 55 extending through the block. The opening 55 is configured to slidably engage the strap 84, allowing the strap 84 to pass through the retention block 53. The retention block 53 has a second opening 57 also extending through the block. The second opening 57 is preferably located further away from the frame member 22 than the first opening 55 and oriented perpendicular to the first opening 55. The second opening 57 is configured to slidably engage the band portion 76 of an equipment retention member 50. The additional equipment retention members 50 connected to the strap 84 may be used to secure, for example, the down tube, seat tube, or another portion of a bicycle to reduce movement with respect to the equipment support 20 of a bicycle secured to the arms 28 at either the distal end 29 or at the retainer member 51, i.e. to stabilize a bicycle against swinging when the bicycle is supported by the arms 25, 28.

Referring again to FIGS. 8-10, the band portion 76 of the equipment retention member 50 has two ends, each end extending in opposite directions from the retaining portion 74 and configured to engage each other to form a loop 66 in generally the same plane as the arm 28 to which the retention member 50 is connected. A first end of the band portion 76 preferably includes a head 78 with an opening 80 therethrough for receiving the second end of the band portion 76. The head 78 may include a pivoting latch member 82 which pivots open to allow the second end of the band portion 76 to enter the opening 80 and which pivots closed to engage the second end of the band portion 76, securing it within the opening 80.

In one embodiment, a first side of the pivoting latch member 82 may include a pawl 83 configured to engage a row of teeth 81 formed along the second end of the band portion 76. The pivoting latch member 82 is biased such that the pawl 83 normally overlaps the opening 80 and is biased against the second end of the band portion 76 as it enters the opening 80. The pawl 83 allows the second end of the band portion 76 to enter the opening 80, but normally engages the teeth 81 when attempting to remove the second end of the band portion 76 from the opening 80. A force may be applied to a second side of the pivoting latch member 82 to rotate the pawl away from the opening 80 and the second end of the band portion 76, thereby permitting the second end to be removed from the opening 80. Alternately, any other means, as known in the art, may be used to secure the two ends of the strap together.

The equipment support 20 further includes at least one but preferably a pair of straps 84 configured to secure the equipment support 20 to the vehicle. It is understood that a strap may be a single member or multiple members connected, for example, by buckles, fasteners, or sewing. Each strap 84 has an adjustable length and preferably includes a first adjusting means 88 positioned on one side of the central portion 24 and a second adjusting means 90 positioned on the opposite side of the central portion 24. Thus, the length of the strap 84 on each side of the frame member 22 may be independently adjusted. Preferably, a portion of each strap 84 is positioned between each of the first and the second adjusting means 88 and 90 and the vehicle V.

Figure 11:
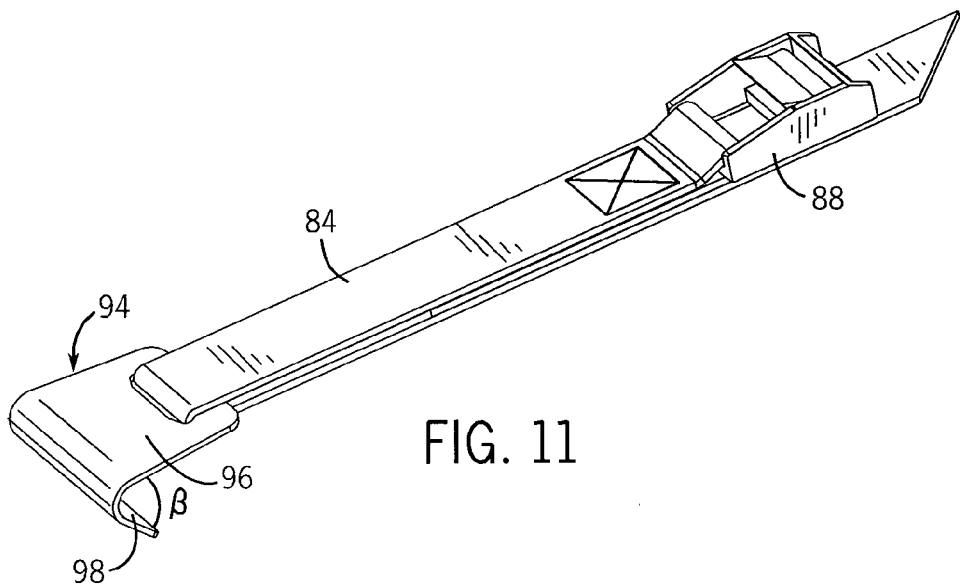
FIG. 11 is a partial isometric view, illustrating a portion of a strap and an embodiment of an attachment member incorporated into the carrier of FIG. 1.
Figure 12:
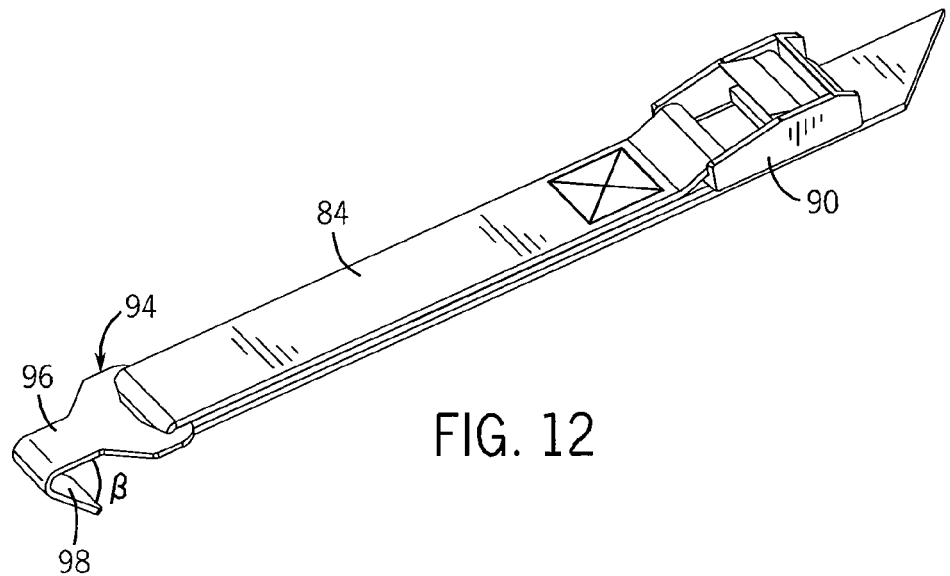
FIG. 12 is a partial isometric view, illustrating a portion of the strap and another embodiment of the attachment member incorporated into the carrier of FIG. 1.
Figure 15:
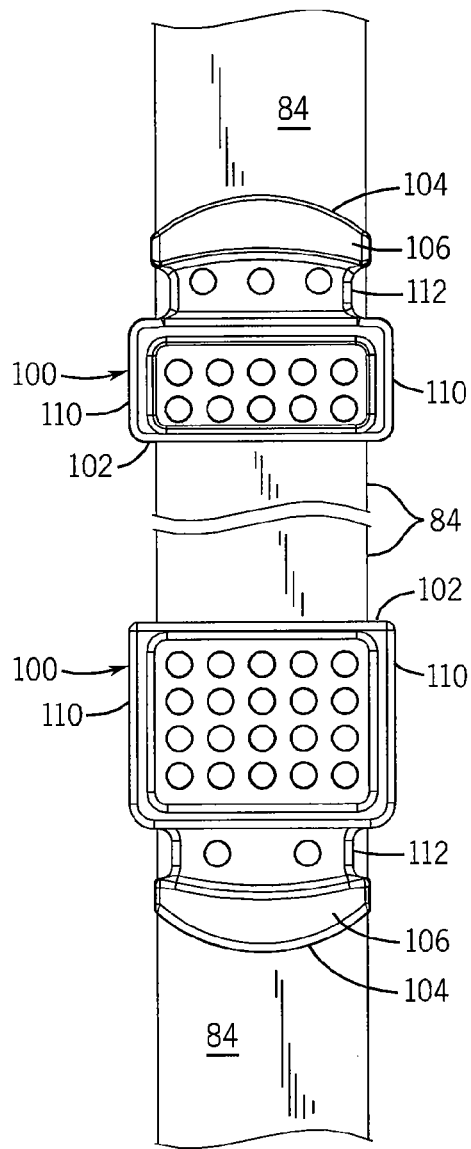
FIG. 15 is a top plan view of the strap and stop members of FIG. 13.
Figure 16:
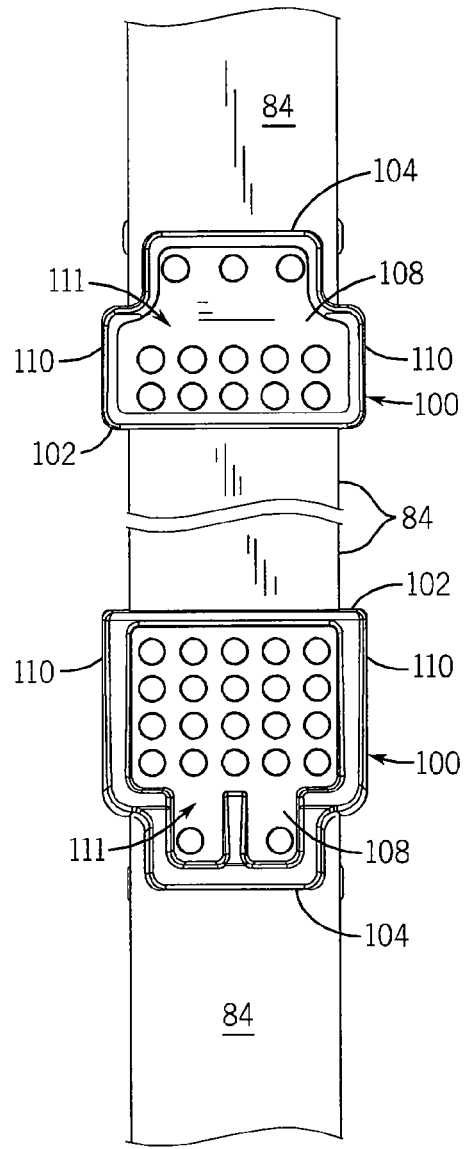
FIG. 16 is a bottom plan view of the strap and stop members of FIG. 13.
Figure 17:
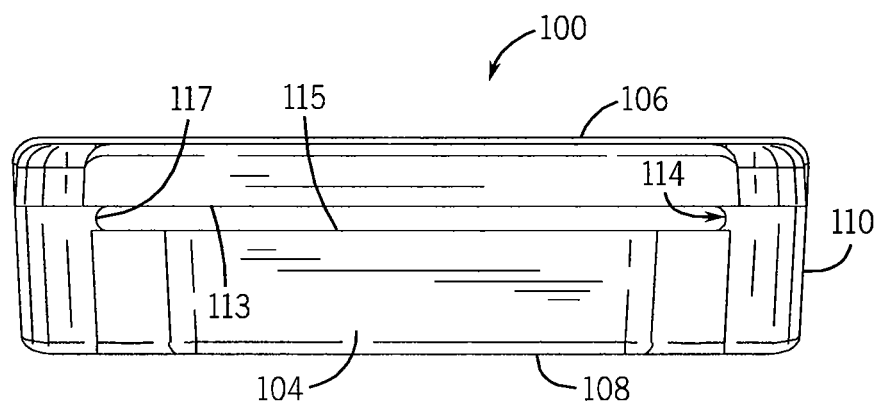
FIG. 17 is a front elevation view of an embodiment of the stop member of FIG. 13.
Figure 18:
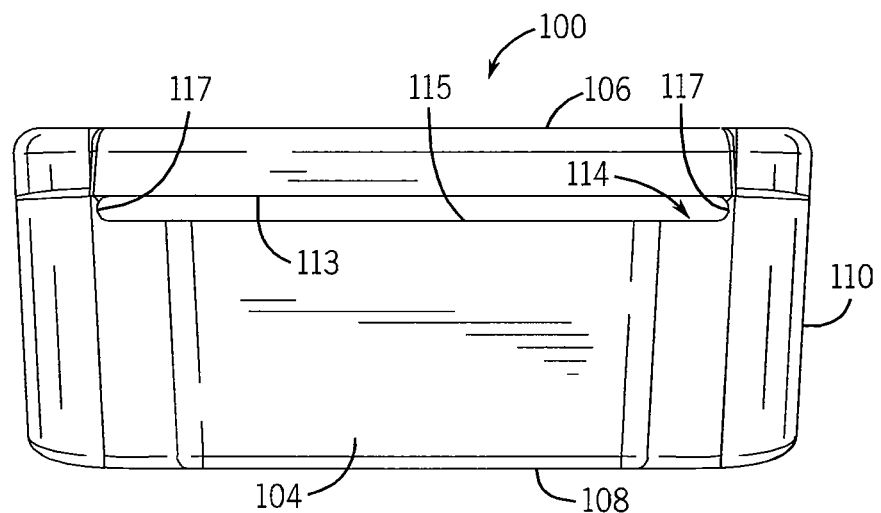
FIG. 18 is a front elevation view of another embodiment of the stop member of FIG. 13.
Figure 19:
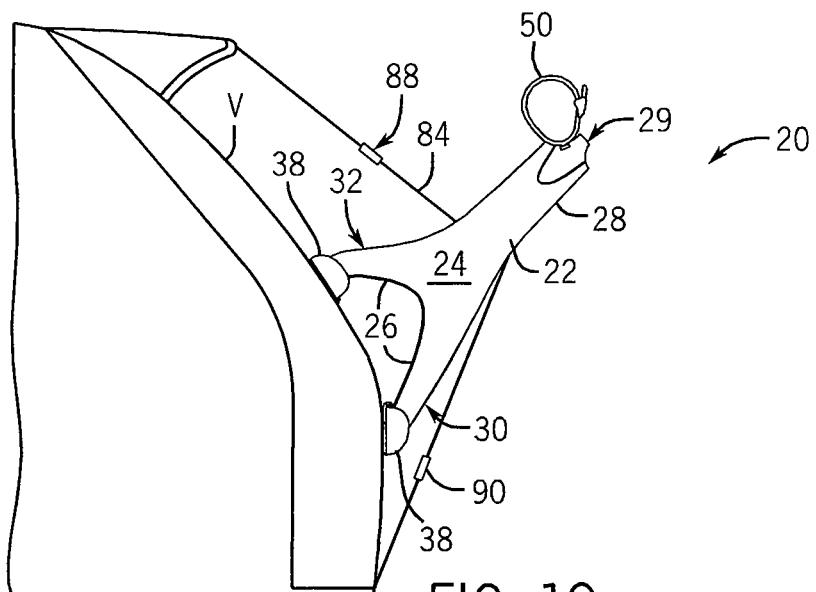
FIG. 19 is a side elevation view of an equipment carrier constructed according to another embodiment of the present invention, in which the equipment carrier is mounted to a vehicle and is illustrated in a first operational configuration.
Figure 20:
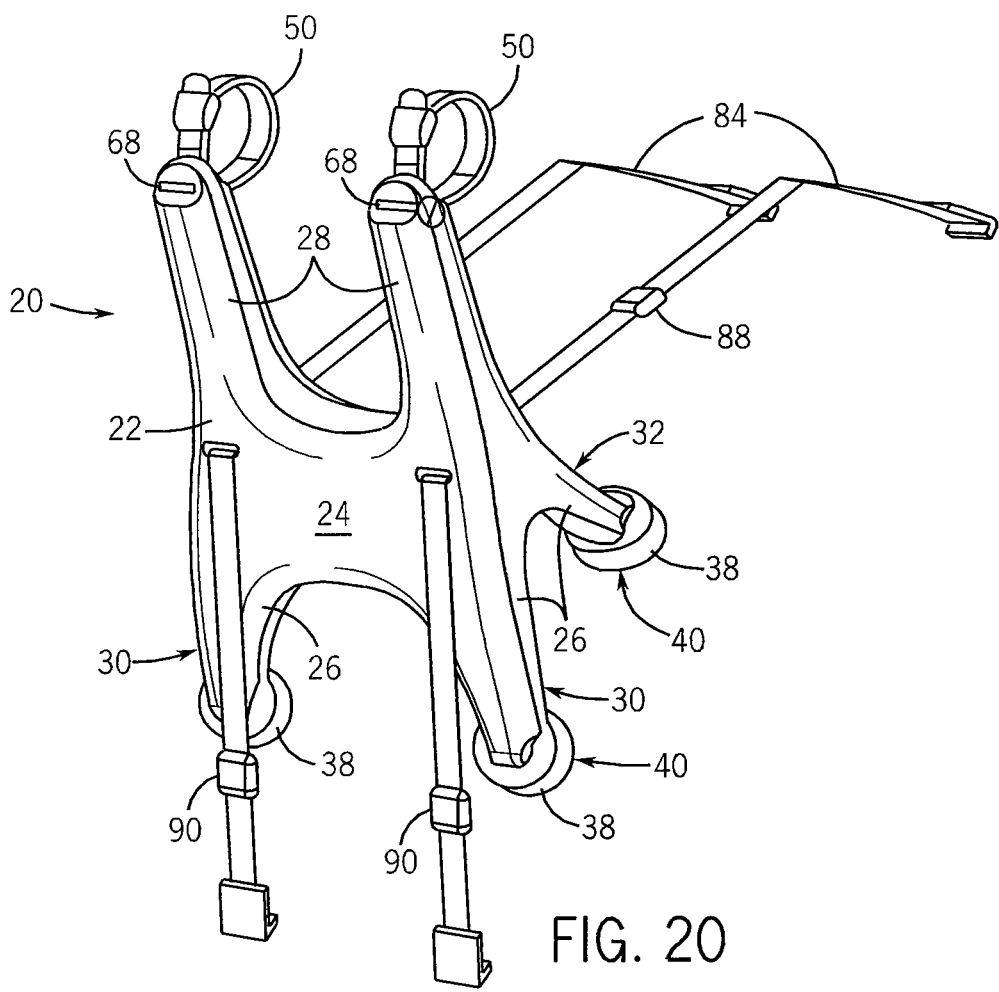
FIG. 20 is an isometric view of the carrier of FIG. 19.
Figure 21:
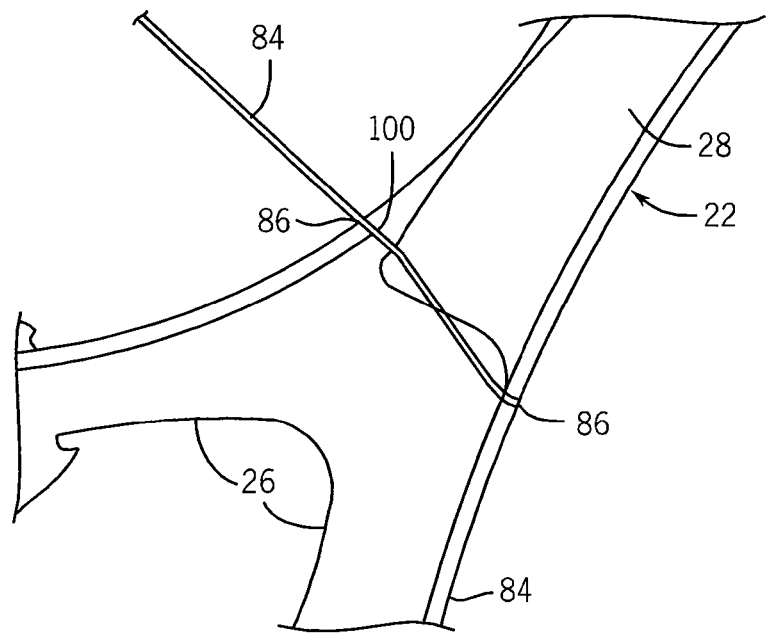
FIG. 21 is a partial side elevation view, illustrating another embodiment of a stop member incorporated into the carrier of FIG. 19.
Figure 22:
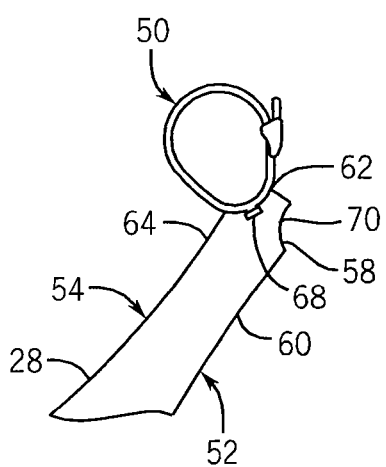
FIG. 22 is a partial side elevation view, illustrating an equipment retention mechanism incorporated into the carrier of FIG. 19 in a first operational configuration.
Figure 23:
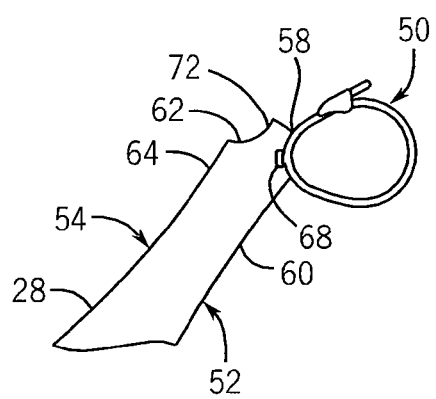
FIG. 23 is a partial side elevation view, illustrating an equipment retention mechanism incorporated into the carrier of FIG. 19 in a second operational configuration.

Referring to FIGS. 11-12, each strap 84 includes an attachment member 94 connected to each end of the strap 84. The attachment member 94 is configured to secure the equipment support 20 to the vehicle V. The attachment member 94 is preferably a hook-shaped bracket, including a first surface 96 that is generally planar and extending from the end of the strap 84. A second surface 98 of the attachment means is also generally planar and forms the hook portion of the attachment member 94. The second surface 98 is angled such that it extends toward the vehicle V and back toward the first surface 96, forming an angle 13 of less than ninety degrees between the first and second surfaces 96 and 98. The attachment member 94 is thin enough to fit between two adjacent body portions of the vehicle V, such as a hatch and the roof or a trunk lid and the adjacent body panel. Alternately, the attachment member 94 may be of any configuration known in the art suitable to secure the equipment support 20 to the vehicle V.

The central portion 24 of the frame member 22 has at least one slot 86 formed therethrough, allowing each strap 84 to pass through the central portion 24 of the support 20. Preferably, a pair of slots 86 aligned with each other are formed in a front and rear surface of the central portion 24 for each strap 84. The equipment support 20 further includes at least one stop 100 associated with each slot 86 and configured to secure the strap 84 to the central portion 24.

Optionally, an anti-sway strap 85 may be connected to each side of the frame member. Referring to FIGS. 24-25, one anti-sway strap 85 is preferably secured to each side of the frame member 22. Each of the anti-sway straps 85 have an adjustable length and include an attachment member 94 at the end of the strap to secure the anti-sway strap 85 to the vehicle. The anti-sway straps 85 are preferably connected to a point on the vehicle to the side of the frame member 22 such as the side of a trunk or tailgate area.

Referring next to FIGS. 13-18, each stop 100 preferably includes a front end 102, a back end 104, an upper surface 106, a lower surface 108, and multiple side surfaces 110. The lower surface 108 extends generally parallel to the upper surface 106 from the back end 104 to a portion of the stop 100 configured to engage the frame member 22. The lower surface 108 then slopes toward the upper surface 106 from the portion of the stop 100 configured to engage the frame member 22 to the front end 102 such that the front end 102 of the stop 100 has a thickness less than the width of the slot 86, allowing the front end 102 of the stop 100 to be inserted into the slot 86. A portion 111 of the lower surface 108 may be recessed below the side surfaces 110 and the recessed portion 111 may extend generally parallel to the upper surface 106. The upper surface 106 includes a recessed portion 112 configured to engage a wall on the frame member 22.

The stop 100 also includes an opening 114 extending from the front end 102 to the back end 104 through which a strap 84 may be passed. The opening 114 includes an upper surface 113, a lower surface 115, and side surfaces 117 extending from the front end 102 of the stop 100 to about the portion of the stop 100 configured to engage the frame member 22. The upper surface 113 and lower surface 115 continue to extend from the portion of the stop 100 configured to engage the frame member 22 to the back end 104 of the stop 100. The stop is preferably constructed from a molded plastic and is flexible enough such that a force applied to the upper surface 106 may cause the upper surface 106 to be deflected toward the lower surface 108. This deflection assists with inserting or removing the stop 100 from the frame member 22.

The stop 100 is preferably over molded onto the straps 84. Over molding the stop 100 to the strap 84 is a process by which the strap 84 is at least partly included within the mold for the stop 100. As the plastic fills the mold, a chemical bond is formed between the strap 84 and the stop 100, securing the stop 100 to the strap 84. Optionally, the stop 100 may be slid onto the strap 84 and mechanically secured to the strap 84 by any means known to one skilled in the art, for example by bending, crimping, or inserting a fastening member through the strap 84.

The equipment support 20 is preferably configured such that a first equipment support 20 may be stacked or nested on top of a second equipment support 20. The ability of one support 20 to nest within another support 20 allows retailers to display larger numbers of the supports 20 in a smaller area, such as in a point of purchase display. In addition, shipping the supports 20 is easier as multiple equipment supports 20 may be packaged together to reduce space and shipping costs.

In one embodiment, the interior of the equipment support 20 is hollow and the central portion 24 is generally open between the first and second lower portions such that an upper portion of a first equipment support may extend up into the central portion and upper portion of a second equipment support. In another embodiment, the upper portion and the lower portion of the equipment support 20 may be offset such that a first equipment support 20 may be placed on top of a second equipment support 20. Alternately, the equipment support 20 may be configured in any manner such that a first support may be stacked on top of, or nested within, a second support in order to reduce storage, display, and shipping space.

In operation, the equipment support 20 secures equipment, for example a bicycle, to a vehicle V. FIG. 1 illustrates one embodiment of the equipment support 20 mounted on a vehicle V. The first pair of legs 30 engages a generally vertical surface on the rear portion of the vehicle V and the second pair of legs 32 engages a generally horizontal surface on the trunk portion of the vehicle V. Optionally, the second pair of legs 32 may engage a sloped portion of the vehicle V, such as a hatch, or the second pair of legs 32 may also engage a generally vertical surface of a vehicle V, such as a tailgate on a van or sport utility vehicle. Optionally, the orientation of the equipment support 20 may be reversed, such that second pair of legs 32 is positioned below the first pair of legs 30. The feet 38 pivot such that the flat surface 40 engages the surface of the vehicle V.

After selecting the orientation for the equipment support 20 best suited for the particular vehicle V to which it is being mounted, the length of each strap 84 is adjusted. Each strap 84 is passed through a pair of slots 86 in the frame member 22 and a pair of stops 100, each secured to the strap 84, engage the pair of slots 100 to secure the strap 84 to the frame member 22. The length of strap 84 extending beyond each side of the frame member is adjusted according to the vehicle V to which the support 20 is being mounted. Using the first and second adjusting means 88 and 90, the length of each strap 84 is further adjusted such that each attachment member 94 may engage the vehicle V, for example by hooking the attachment member 94 around an edge of a hatch or trunk of the vehicle V. Once the attachment member 94 has engaged the vehicle V, the length of each strap 84 is finally adjusted to tighten the strap 84 and firmly seat each attachment member 94 and secure the equipment support 20 against the vehicle V.

Each equipment retention member 50 is then adjusted to secure a piece of equipment, such as a bicycle, to the support 20. A retaining portion 74 of the retention member 50 is inserted into the channel 68 on an arm 28. A bicycle is then placed on the arm 28 and within the band portion 76 of the equipment retention member 50. The second end of the band portion 76 may then be inserted into the opening 80 within the head 78 on the first end of the band portion 76. The second end is pulled through the opening 80 and the pawl 83 engages the teeth 81 to prevent the band portion 76 from sliding back out of the opening 80, tightening the band portion 76 against the frame or tube of a bicycle and thus securing the bicycle to the equipment support 20.

Preferably, the weight of the equipment also provides a compressive force on the frame member 22 to help secure the equipment to the support 20 and the support to the vehicle V. The frame member 22 is preferably constructed of a plastic material such as 12.5% glass filled polypropylene in a molding process, although it is understood that any other suitable forming method or material may be employed. The frame member 22 has walls with a thickness of about 2.75 mm. Consequently, when a bicycle is placed on the support 20, the average weight of a bicycle causes compression in the arms 28 such that the retention member 50 is secured within the channel 68. Similarly, compression in the central portion 24 secures each stop 100 in its respective slot 86.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various alternatives and embodiments are contemplated as being within the scope of the following claims particularly pointing out and distinctly claiming the subject matter regarded as the invention.

I claim:

1. An equipment carrier for mounting to a vehicle, comprising:

equipment support structure having an equipment support area configured to support an item of equipment from the vehicle in a suspension-type manner;

at least one flexible elongated vehicle engagement member extending downwardly from the equipment support structure, wherein the flexible elongated vehicle engagement member extends along a longitudinal axis and defines a lower end having a hook member that is configured for engagement with the vehicle to maintain the equipment support structure in position on the vehicle; and a stabilizing member carried by the flexible elongated vehicle engagement member, wherein the stabilizing member is separate from and located between the hook member and the equipment support structure and defines an equipment engagement area configured to engage the item of equipment, wherein the equipment engagement area is offset from the longitudinal axis of the flexible elongated vehicle engagement member, and wherein the stabilizing member further includes an equipment engagement arrangement that is configured to be positioned about the item of equipment and that engages the item of equipment against the equipment engagement area at a location below the equipment support structure and above the hook member, wherein, when the equipment support structure is positioned on the vehicle and the hook member is engaged with the vehicle, the stabilizing member is engaged with the item of equipment via the equipment engagement arrangement below the equipment support area and above the hook member to draw the item of equipment against the equipment engagement area and stabilize the item of equipment against swaying movement during movement of the vehicle.

2. The equipment carrier of claim 1, wherein the equipment support structure comprises a bicycle carrier and the item of equipment comprises a bicycle, wherein the equipment support area of the equipment support structure comprises one or more bicycle support members that extend rearwardly from the vehicle when the bicycle carrier is positioned on the vehicle, and wherein the flexible elongated vehicle engagement member comprises a strap.

3. The equipment carrier of claim 2, wherein the stabilizing member is movably engaged with the strap so as to be movable to varying positions along the strap between the hook member and the one or more bicycle support members.

4. The equipment carrier of claim 3, wherein the equipment engagement arrangement comprises a band carried by the stabilizing member and extending from the equipment engagement area of the stabilizing member, wherein the band is configured to be wrapped around an area of the bicycle located adjacent the equipment engagement area when the bicycle is supported by the one or more bicycle support members.

5. The equipment carrier of claim 1, wherein the stabilizing member is movably engaged with the flexible elongated vehicle engagement member so as to be movable to varying positions along the flexible elongated vehicle engagement member between the hook member and the equipment support structure.

6. A carrier for supporting an item of equipment on a vehicle, comprising:
   equipment support structure having an equipment support area configured to support an item of equipment from the vehicle in a suspension-type manner;
   a strap having a first end secured to the equipment support structure and a second end having a hook member configured for selective engagement with the vehicle, wherein the strap extends along a longitudinal axis; and
   a stabilizer separate from the hook member and the equipment support structure and carried by the strap, wherein the stabilizer is located between the hook member and the first end of the strap, wherein the stabilizer includes an equipment engagement area and an equipment engagement arrangement that is configured to be positioned about the item of equipment, wherein the equipment engagement area is offset from the longitudinal axis of the strap, wherein when the equipment support structure is positioned on the vehicle and the hook member is engaged with the vehicle, the item of equipment is engaged against the equipment engagement area via the equipment engagement arrangement at a location below the equipment support structure and above the hook member to stabilize the item of equipment against swaying movement during movement of the vehicle.

7. The carrier of claim 6, wherein the item of equipment comprises a bicycle, and wherein the equipment support area of the equipment support structure comprises one or more bicycle support members that extend rearwardly from the vehicle when the carrier is positioned on the vehicle.

8. The carrier of claim 7, wherein the stabilizer is movably engaged with the strap so as to be movable to varying positions along the strap between the hook member and the one or more bicycle support members.

9. The carrier of claim 8, wherein the equipment engagement arrangement comprises a band carried by the stabilizer, wherein the band is configured to be wrapped around an area of the bicycle located adjacent the engagement area of the stabilizer when the bicycle is supported by the one or more bicycle support members.

* * * * *